(12) United States Patent
Park et al.

(10) Patent No.: US 8,264,633 B2
(45) Date of Patent: Sep. 11, 2012

(54) BACKLIGHT UNIT AND LIQUID CRYSTAL DISPLAY USING THE SAME

(75) Inventors: Dong Nyuck Park, Gyeonggi-Do (KR); Shim Keun Youk, Seoul (KR)

(73) Assignee: LG Display Co., Ltd., Seoul (KR)

( * ) Notice: Subject to any disclaimer, the term of this patent is extended or adjusted under 35 U.S.C. 154(b) by 987 days.

(21) Appl. No.: 12/155,440

(22) Filed: Jun. 4, 2008

(65) Prior Publication Data

US 2008/0303973 A1 Dec. 11, 2008

(30) Foreign Application Priority Data

Jun. 8, 2007 (KR) .................. 10-2007-0055816

(51) Int. Cl.
*G02F 1/1333* (2006.01)
*F21V 17/08* (2006.01)

(52) U.S. Cl. .......... 349/58; 315/246; 315/250; 315/255; 315/291; 315/307; 362/217; 362/225; 362/632; 362/633; 362/634; 345/102

(58) Field of Classification Search .................. 315/246, 315/250, 255, 291, 307, 308, 312; 345/102; 349/58; 362/217, 225, 632, 633, 634

See application file for complete search history.

(56) References Cited

U.S. PATENT DOCUMENTS

| | | | | |
|---|---|---|---|---|
| 7,637,625 B2 * | 12/2009 | Kwon et al. | ................. | 362/97.2 |
| 2004/0246394 A1 * | 12/2004 | Ono et al. | ..................... | 349/53 |
| 2006/0023471 A1 * | 2/2006 | Ahn et al. | ..................... | 362/613 |
| 2006/0072322 A1 * | 4/2006 | Lee et al. | ....................... | 362/260 |
| 2006/0279957 A1 * | 12/2006 | Kwon et al. | ................... | 362/378 |
| 2006/0291190 A1 * | 12/2006 | Tsai | ................................. | 362/97 |
| 2007/0139911 A1 * | 6/2007 | Yang et al. | ..................... | 362/97 |
| 2007/0286629 A1 * | 12/2007 | Kwon et al. | ................... | 399/69 |
| 2007/0291471 A1 * | 12/2007 | Moon et al. | ..................... | 362/97 |
| 2008/0218089 A1 * | 9/2008 | Takata | ...................... | 315/169.1 |

* cited by examiner

*Primary Examiner* — Douglas W Owens
*Assistant Examiner* — Thai Pham
(74) *Attorney, Agent, or Firm* — Morgan, Lewis & Bockius LLP

(57) ABSTRACT

A backlight unit and a liquid crystal display using the same are provided. The backlight unit includes a plurality of lamps, each including first and second electrodes, first and second substrates, a bottom case for receiving the substrates and lamps, first and second inverter units, and first and second wires. First and second common electrode patterns are formed on the first and second substrates and are commonly connected to the first and second electrodes, respectively. The first and second inverter units are disposed on a rear surface of the bottom case at positions corresponding to the first and second substrates, respectively. The first wire connects the first common electrode pattern and the first inverter unit via holes in the first substrate and the bottom case. The second wire connects the second common electrode pattern and the second inverter unit via holes in the second substrate and the bottom case.

8 Claims, 4 Drawing Sheets

BACKLIGHT UNIT AND LIQUID CRYSTAL DISPLAY USING THE SAME

This application claims the benefit of Korean Patent Application No. P2007-055816, filed on Jun. 8, 2007, which is hereby incorporated by reference as if fully set forth herein.

BACKGROUND OF THE INVENTION

1. Field of the Invention

The present invention relates to a liquid crystal display, and more particularly, to a backlight unit capable of preventing noise and a liquid crystal display using the same.

2. Discussion of the Related Art

Generally, a liquid crystal display displays desired images by controlling the transmittance of light emitted by a backlight unit.

Backlight units are classified into edge-type backlight units and direct-type backlight units depending on the positions of lamps. Edge-type backlight units are mainly used for small-size liquid crystal displays such as notebooks and direct-type backlight units are mainly used for large-size liquid crystal displays such as televisions.

Direct-type backlight units require a large number of lamps for high and uniform luminance. To achieve cost reduction and drive reliability, recent direct-type backlight units use External Electrode Fluorescent Lamps (EEFLS) which can be driven in parallel by a single inverter. External electrodes are formed at both ends of each EEFL. Thus, to achieve parallel driving, the direct-type backlight unit includes a plurality of common lines for supplying lamp drive voltages and a plurality of sockets for fixing the lamps in order to connect the external electrodes of the lamps in parallel.

Conventional direct-type backlight units have a plurality of molded substrates for fixing sockets and common lines. The sockets are fixed to the molded substrates using individual screws. Wires for supplying lamp drive voltages are also fixed to ends of the molded substrates using individual screws, such that the wires are connected to the common lines, and the inverter unit is then connected to the wires outside the backlight unit. The molded substrates with the sockets and common lines fixed thereto are fixed to a bottom case using the same method.

The sockets and common lines, which are fixed to the plurality of molded substrates using screws in the above manner, produce noise due to vibration caused by voltages supplied thereto and thermal expansion thereof. In addition, fixing the sockets to the molded substrate using individual screws increases assembly time and costs. Further, connecting the wires for supplying lamp drive voltages to the inverter unit outside the backlight unit complicates arrangement of wires and increases the volume of the liquid crystal display.

SUMMARY OF THE INVENTION

Accordingly, the present invention is directed to a a backlight unit and a liquid crystal display using the same that substantially obviate one or more problems due to limitations and disadvantages of the related art.

An object of the present invention is to provide a backlight unit for preventing noise and simplifying assembly of the backlight unit and a liquid crystal display using the backlight unit.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a backlight unit includes a plurality of lamps including a plurality of first electrodes and a plurality of second electrodes, respectively; a first substrate including a first common electrode pattern formed thereon and commonly connected to the plurality of first electrodes; a second substrate including a second common electrode pattern formed thereon and commonly connected to the plurality of second electrodes; a bottom case for receiving the first and second substrates and the plurality of lamps; a first inverter unit disposed on a rear surface of the bottom case at a position corresponding to the first substrate; a second inverter unit disposed on the rear surface of the bottom case at a position corresponding to the second substrate; a first wire electrically connecting the first common electrode pattern and the first inverter unit to each other via a through hole in the first substrate and the bottom case; and a second wire electrically connecting the second common electrode pattern and the second inverter unit to each other via a through hole in the second substrate and the bottom case.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to a backlight unit and a liquid crystal display using the same according to the preferred embodiments of the present invention, examples of which are illustrated in the accompanying drawings. Wherever possible, the same reference numbers will be used throughout the drawings to refer to the same or like parts.

Figure 1:
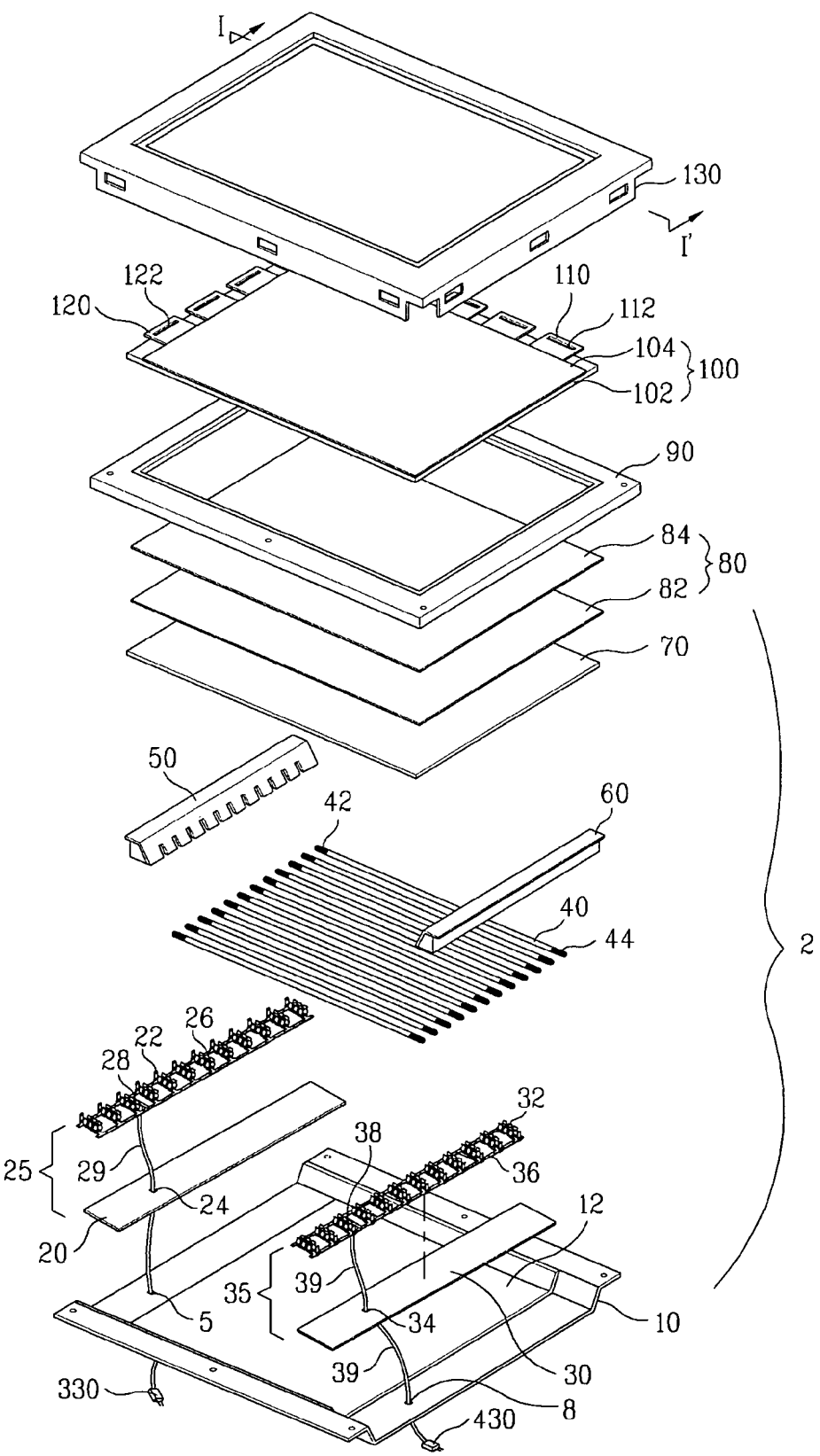
FIG. 1 is a perspective exploded view schematically illustrating a liquid crystal display including a backlight unit according to an embodiment of the invention.
Figure 2:
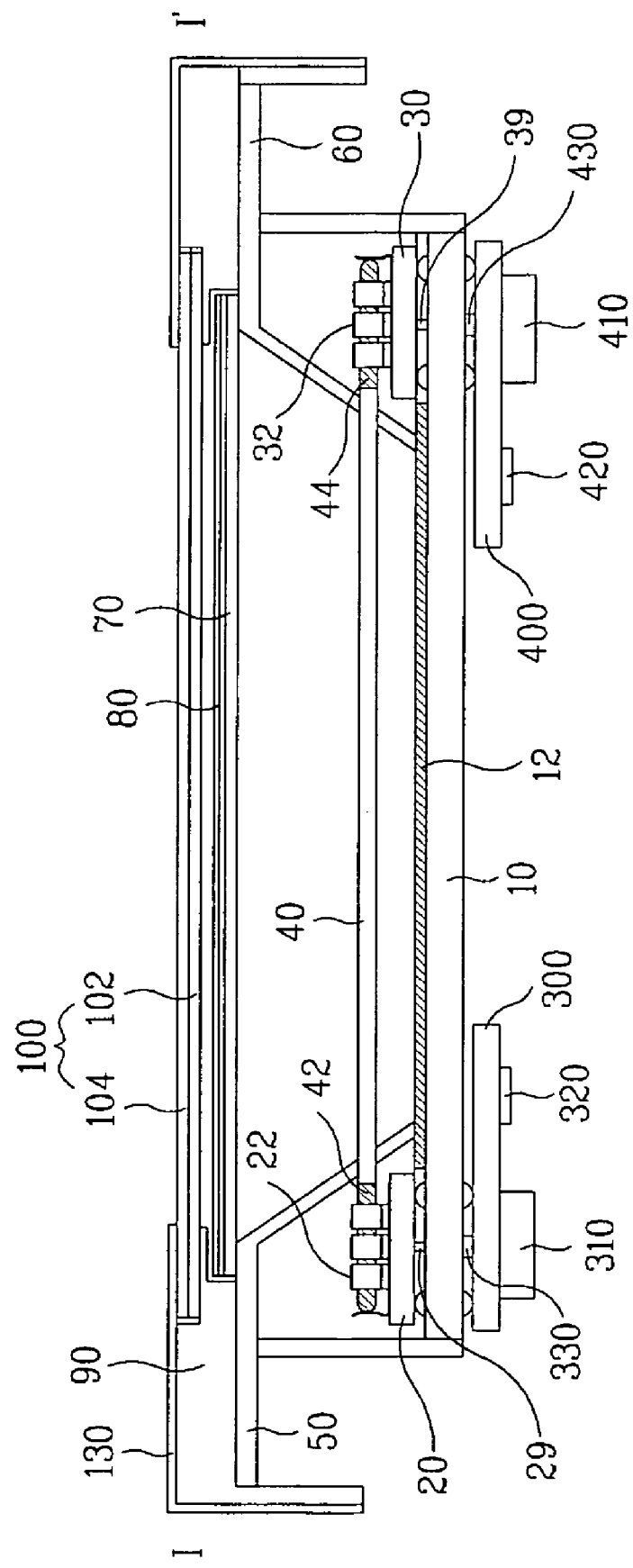
FIG. 2 is a cross-sectional view of the liquid crystal display taken along line I-I' in FIG. 1.

FIG. 1 is a perspective exploded view schematically illustrating a liquid crystal display including a backlight unit according to an embodiment of the invention and FIG. 2 is a cross-sectional view of the liquid crystal display taken along line I-I' in FIG. 1.

The liquid crystal display shown in FIGS. 1 and 2 includes a liquid crystal panel 100 for displaying images, a backlight unit 2 for providing light to the liquid crystal panel 100, front and bottom cases 130 and 10 for receiving the liquid crystal panel 100 and the backlight unit 2.

The front case 130 is bent at edges thereof so as to surround a non-display portion of the liquid crystal panel 100 and side surfaces of the bottom case 10. The front case 130 is fastened to a panel guide 90 that surrounds the side surfaces of the bottom case 10.

A reflecting sheet 12 or a reflecting material for reflecting light from each lamp 40 toward the liquid crystal panel 100 is attached to or coated over an inner surface of the bottom case 10. Holes 5 and 8 are formed at both edges of a bottom surface of the bottom case 10.

The liquid crystal panel 100 is disposed on the panel guide 90 to display images by controlling transmittance of light from the backlight unit 2 according to image signals. The liquid crystal panel 100 includes a liquid crystal layer (not shown) formed between lower and upper substrates 102 and 104 and spacers (not shown) maintaining a constant interval between the lower and upper substrates 102 and 104.

The upper substrate 104 includes color filters, black matrices, common electrodes, etc.

The lower substrate 102 includes thin film transistors and pixel electrodes connected to the thin film transistors. The common electrodes may be formed on the lower substrate 102 instead of the upper substrate 104 according to liquid crystal modes.

A data pad region connected to data lines (not shown) and a gate pad region connected to gate lines (not shown) are formed on the non-display portion of the lower substrate 102. A plurality of data circuit films 110 is attached to the data pad region. A data integrated circuit 112 for providing image signals to data lines is mounted on each of the data circuit films 110. A plurality of gate circuit films 120 is attached to the gate pad region. A gate integrated circuit 122 for providing scan signals to gate lines is mounted on each of the gate circuit films 110.

Alternatively, the data integrated circuit 112 and the gate integrated circuit 122 may be mounted directly on the lower substrate 102 using a Chip On Glass (COG) method or the gate integrated circuit 122 may be formed and embedded together with thin film transistors of the lower substrate 102.

The panel guide 90 is mounted on a seat portion of the bottom case 10 so as to surround the side surfaces of the bottom case 10 while surrounding edges and side surfaces of a diffusion plate 70 and a plurality of optical sheets 80. The panel guide 90 constructed as described above serves to prevent movement of the backlight unit 2 and absorb external impacts applied to the backlight unit 2.

The backlight unit 2 includes a plurality of lamps 40, each including first and second electrodes 42 and 44, a diffusion plate 70 disposed under the panel guide 90 opposite the plurality of lamps 40, at least one optical sheet 80 disposed on the diffusion plate 70, a first connection portion 25 electrically connected to the first electrodes 42 of the lamps 40, a first side frame 50 disposed at one side of the bottom case 10 so as to surround the first connection portion 25 and one ends of the lamps 40, a second connection portion 35 electrically connected to the second electrodes 44 of the lamps 40, and a second side frame 60 disposed at the opposite side of the bottom case 10 so as to surround the second connection portion 35 and the other ends of the lamps 40.

The diffusion plate 70 diffuses light emitted by the plurality of lamps 40 over the entire region of the liquid crystal panel 100.

The plurality of optical sheets 80 causes light diffused by the diffusion plate 70 to be radiated to the liquid crystal panel 100 at right angles. To accomplish this, the plurality of optical sheets 80 may include at least one prism sheet 82 and 84 for focusing light diffused by the diffusion plate 70.

The first side frame 50 is disposed at one edge of the bottom case 10 so as to surround one ends of the lamps 40 mounted on the first connection portion 25. To accomplish this, the first side frame 50 has an inclined surface, which reflects light radiated from the lamps 40, and lamp holes, which pass through the inclined surface to insert both ends of the lamps 40 to into the lamp holes. The first side frame 50 is mounted at one edge of the bottom case 10 using screws.

The second side frame 60 is disposed at the opposite edge of the bottom case 10 so as to surround one ends of the lamps 40 mounted on the second connection portion 35. To accomplish this, the second side frame 60 has an inclined surface which reflects light radiated from the lamps 40 and lamp holes, which pass through the inclined surface to insert both ends of the lamps 40 to into the lamp holes. The second side frame 60 is mounted at the opposite edge of the bottom case 10 using screws.

Each of the plurality of lamps 40 is disposed facing the liquid crystal panel 100 and is detachably attached to the first and second connection portions 25 and 35. A drive voltage supplied through the first and second connection portions 25 and 35 turns on each of the plurality of lamps 40 to emit light to the liquid crystal panel 100. An External Electrode Fluorescent Lamp (EEFL) is used as each of the plurality of lamps 40. The EEFL includes a lamp tube, in which gas discharge causes a phosphor to emit light, and first and second electrodes 42 and 44 formed at the outer surfaces of both ends of the lamp tube.

Although not illustrated, a Hot Cathode Fluorescent Lamp (HCFL) or Cold Cathode Fluorescent Lamp (CCFL) with an electrode connected to either internal end thereof may be used as each of the plurality of lamps 40. This may change the socket structure.

The first connection portion 25 includes a first common electrode pattern 26 which supplies a first drive voltage and a plurality of first sockets 22 to which the first electrodes 42 of the lamp are fixed so that the first electrodes 42 are connected to the first common electrode pattern 26. The first common electrode pattern 26 and the first sockets 22 are attached to the first substrate 20. The first common electrode pattern 26 and the first sockets 22 are integrally formed.

The second connection portion 35 includes a second common electrode pattern 36 which supplies a second drive voltage and a plurality of second sockets 32 to which the second electrodes 44 of the lamp 40 are fixed so that the second electrodes 44 are connected to the second common electrode pattern 36. The second common electrode pattern 36 and the second sockets 32 are attached to the second substrate 30. The second common electrode pattern 36 and the second sockets 32 are integrally formed.

The backlight unit 2 further includes first and second connector units connected respectively to the first and second connection portions 25 and 35. The first connector unit includes a first upper connector 28 formed on the first connection portion 25, a first wire 29 connected to the first upper connector 28, and a first lower connector 330 connected to an end of the first wire 29 and connected to a first inverter unit. The second connector unit includes a second upper connector 38 formed on the second connection portion 35, a second wire 39 connected to the second upper connector 38, and a second lower connector 430 connected to an end of the second wire 39 and connected to a second inverter unit. The first wire 29 connected to the first upper connector 28 is connected to the first inverter unit via through holes 24 and 5 that pass through the first substrate 20 and the bottom case 10. The second wire 39 connected to the second upper connector 38 is connected to the second inverter unit via through holes 34 and 8 that pass through the second substrate 30 and the bottom case 10.

A Printed Circuit Board (PCB) may be used as each of the first and second substrates 20 and 30. The first and second connection portions 25 and 35 are fixed respectively to the first and second substrates 20 and 30 through soldering, Surface Mounting Technology (SMT) processing, welding, or the like. The first and second upper connectors 28 and 38 are connected respectively to the first and second connection portions 25 and 35 using the same method.

As shown in FIG. 2, the backlight unit 2 includes the first and second inverter units for generating the first and second drive voltages, the first wire 29 for supplying the first drive voltage from the first inverter unit to the first connection portion 25, and the second wire 39 for supplying the second drive voltage from the second inverter unit to the second connection portion 35.

The first inverter unit includes a first inverter substrate 300 disposed at one side of a rear surface of the bottom case 10, a first inverter integrated circuit 320 for converting a DC voltage into an AC voltage, a first transformer 310 for raising the AC voltage to the first drive voltage, and a first wire connector (not shown) formed in the first inverter substrate 200 such that the first wire connector is electrically connected to the first lower connector 330.

The first transformer 310 raises the AC voltage supplied from the first inverter integrated circuit 320 to the first drive voltage and supplies the first drive voltage to the first wire 29 through the first lower connector 330 connected to the first inverter connector of the first inverter substrate 200.

The second inverter unit includes a second inverter substrate 400 disposed at the opposite side of the rear surface of the bottom case 10, a second inverter integrated circuit 420 for converting a DC voltage into an AC voltage, a second transformer 410 for raising the AC voltage to the second drive voltage, and a second wire connector (not shown) formed in the second inverter substrate 400 such that the second wire connector is electrically connected to the second lower connector 430.

The second transformer 410 raises the AC voltage supplied from the second inverter integrated circuit 420 to the second drive voltage and supplies the second drive voltage to the second wire 39 through the second lower connector 430 connected to the second inverter connector of the second inverter substrate 400.

Figure 3:
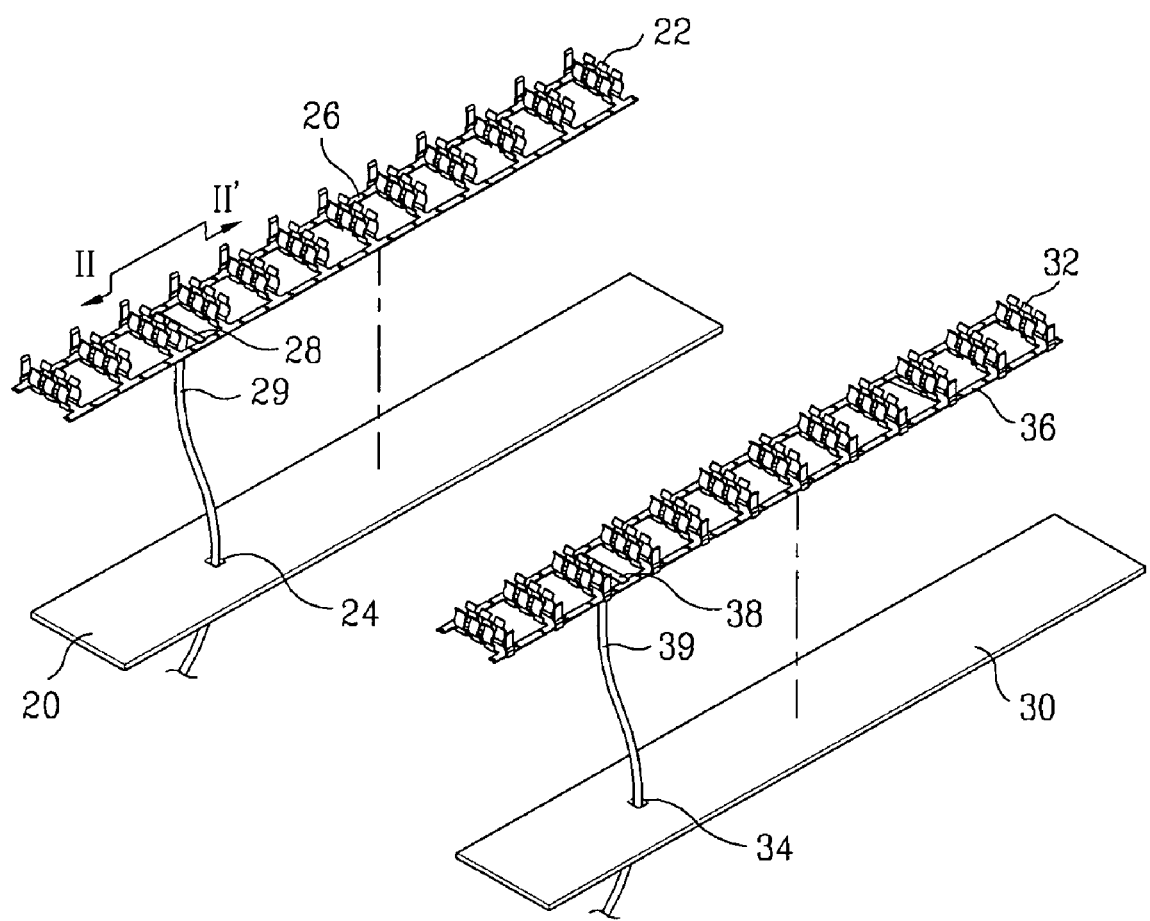
FIG. 3 illustrates structures of connection portions and connector units shown in FIG. 1.
Figure 4:
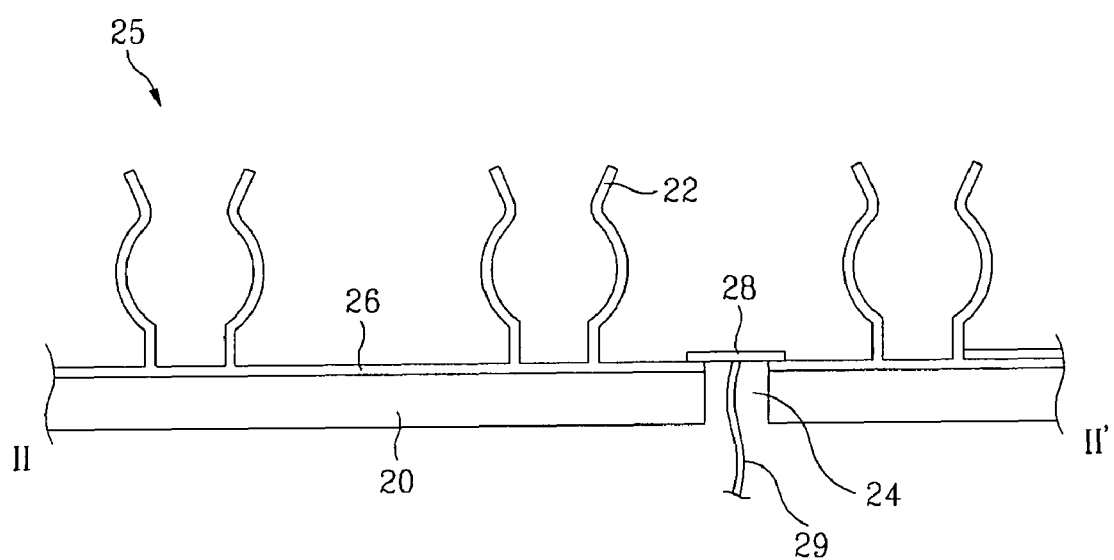
FIG. 4 illustrates cross-sections of a first connection portion and an upper connector unit, taken along line II-II' of FIG. 3.

Details of the first and second connection portions 25 and 35 and the first and second connector units are illustrated in FIGS. 3 and 4.

FIG. 3 illustrates structures of the plurality of connection portions 25 and 35 and the connector units of the backlight unit 2 and FIG. 4 illustrates cross-sections of the first connection portion 25 and the upper connector unit 28, taken along line II-II' of FIG. 3.

As shown in FIGS. 3 and 4, the first and second upper connectors 28 and 38 are connected to the first and second electrode patterns 26 and 36, respectively, and the first and second connectors 29 and 39 connected to the first and second connectors 28 and 38 are connected to the first and second inverter units via holes 24 and 34 of the first and second substrates 20 and 30 and the holes (5 and 8 in FIG. 1) of the bottom case 10, respectively. Accordingly, the first wire 29 transfers the first drive voltage to the first upper connector 28 to supply the first drive voltage to the first common electrode pattern 26, and the second wire 39 transfers the second drive voltage to the second upper connector 38 to supply the second drive voltage to the second common electrode pattern 36.

Here, the first drive voltage supplied to the first connection portion 25 through the first wire 29 and the second drive voltage supplied to the second connection portion 35 through the second wire 39 are opposite in phase. For example, when a positive voltage is applied to the first connection portion 25, a negative voltage is applied to the second connection portion 35.

As is apparent from the above description, the backlight unit and the liquid crystal display using the same according to the invention have the following advantages.

First, noise due to vibration caused by supplied voltages and thermal expansion is prevented and assembly is simplified since the first and second connection portions, each including a plurality of sockets and a common electrode pattern, are attached to PCBs through soldering, SMT processing, welding, or the like.

Second, wires can be easily arranged and the thickness of the liquid crystal display can be reduced since wires are connected to the inverter units via through holes in the PCBs and the bottom case.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A backlight unit comprising:
   a plurality of lamps including a plurality of first electrodes and a plurality of second electrodes, respectively;
   a first substrate including a first common electrode pattern formed thereon and commonly connected to the plurality of first electrodes; a second substrate including a second common electrode pattern formed thereon and commonly connected to the plurality of second electrodes;
   a bottom case for receiving the first and second substrates and the plurality of lamps;
   a first inverter unit disposed on a rear surface of the bottom case at a position corresponding to the first substrate;
   a second inverter unit disposed on the rear surface of the bottom case at a position corresponding to the second substrate;
   a first wire electrically connecting the first common electrode pattern and the first inverter unit to each other via a first upper through hole in the first substrate and a first lower through hole in the bottom case;
   a second wire electrically connecting the second common electrode pattern and the second inverter unit to each other via a second upper through hole in the second substrate and a second lower through hole in the bottom case;
   a plurality of first sockets fixing the plurality of first electrodes thereto such that the plurality of first electrodes is connected to the first common electrode pattern, wherein the first sockets are integrated with the first common electrode pattern; and
   a plurality of second sockets fixing the plurality of second electrodes thereto such that the plurality of second electrodes is connected to the second common electrode pattern, wherein the second sockets are integrated with the second common electrode pattern.

2. The backlight unit according to claim 1, further comprising:
   a first upper connector formed in contact with the first common electrode pattern;

a first lower connector connected to the first wire and electrically connected to the first inverter unit;
a second upper connector formed in contact with the second common electrode pattern; and
a second lower connector connected to the second wire and electrically connected to the second inverter unit.

3. The backlight unit according to claim 1 or 2, wherein the first and second common electrode patterns are coupled respectively to the first and second substrates and the first and second common electrode patterns are coupled respectively to the first and second upper connectors through one of soldering, Surface Mounting Technology (SMT) processing, and welding.

4. The backlight unit according to claim 1, wherein each of the first and second substrates is a printed circuit board.

5. A liquid crystal display comprising:
a liquid crystal panel; and
a backlight unit for providing light to the liquid crystal panel,
the backlight unit including:
a plurality of lamps including a plurality of first electrodes and a plurality of second electrodes, respectively;
a first substrate including a first common electrode pattern formed thereon and commonly connected to the plurality of first electrodes;
a second substrate including a second common electrode pattern formed thereon and commonly connected to the plurality of second electrodes;
a bottom case for receiving the first and second substrates and the plurality of lamps;
a first inverter unit disposed on a rear surface of the bottom case at a position corresponding to the first substrate;
a second inverter unit disposed on the rear surface of the bottom case at a position corresponding to the second substrate;
a first wire electrically connecting the first common electrode pattern and the first inverter unit to each other via a first upper through hole in the first substrate and a first lower through hole in the bottom case;
a second wire electrically connecting the second common electrode pattern and the second inverter unit to each other via a second upper through hole in the second substrate and a second lower through hole in the bottom case;
a plurality of first sockets fixing the plurality of first electrodes thereto such that the plurality of first electrodes is connected to the first common electrode pattern, wherein the first sockets are integrated with the first common electrode pattern; and
a plurality of second sockets fixing the plurality of second electrodes thereto such that the plurality of second electrodes is connected to the second common electrode pattern, wherein the second sockets are integrated with the second common electrode pattern.

6. The liquid crystal display according to claim 5, wherein the backlight unit further includes:
a first upper connector formed in contact with the first common electrode pattern;
a first lower connector connected to the first wire and electrically connected to the first inverter unit;
a second upper connector formed in contact with the second common electrode pattern; and
a second lower connector connected to the second wire and electrically connected to the second inverter unit.

7. The backlight unit according to claim 5 or 6, wherein the first and second common electrode patterns are coupled respectively to the first and second substrates and the first and second common electrode patterns are coupled respectively to the first and second upper connectors through one of soldering, Surface Mounting Technology (SMT.) processing, and welding.

8. The liquid crystal display according to claim 5, wherein each of the first and second substrates is a printed circuit board.

* * * * *